US011567911B2

(12) United States Patent
Gorishniy et al.

(10) Patent No.: US 11,567,911 B2
(45) Date of Patent: Jan. 31, 2023

(54) SYSTEM AND METHOD FOR MANAGEMENT OF FUNCTIONALLY LINKED DATA

(71) Applicants: Sergey Anatol'Evich Gorishniy, Rostov-na-Donu (RU); Anatoliy Aleksandrovich Kondrik, Rostov-na-Donu (RU)

(72) Inventors: Sergey Anatol'Evich Gorishniy, Rostov-na-Donu (RU); Anatoliy Aleksandrovich Kondrik, Rostov-na-Donu (RU)

(*) Notice: Subject to any disclaimer, the term of this patent is extended or adjusted under 35 U.S.C. 154(b) by 952 days.

(21) Appl. No.: 15/536,733

(22) PCT Filed: Dec. 19, 2014

(86) PCT No.: PCT/RU2014/000959
§ 371 (c)(1),
(2) Date: Jun. 16, 2017

(87) PCT Pub. No.: WO2016/099318
PCT Pub. Date: Jun. 23, 2016

(65) Prior Publication Data
US 2017/0344585 A1 Nov. 30, 2017

(51) Int. Cl.
*G06F 16/00* (2019.01)
*G06F 16/21* (2019.01)
*G06F 9/44* (2018.01)
*G06F 16/28* (2019.01)

(52) U.S. Cl.
CPC .............. *G06F 16/212* (2019.01); *G06F 9/44* (2013.01); *G06F 16/288* (2019.01)

(58) Field of Classification Search
CPC ........ G06F 16/212; G06F 9/44; G06F 16/288; G06F 16/31; G06F 3/048
See application file for complete search history.

(56) References Cited

U.S. PATENT DOCUMENTS

| | | |
|---|---|---|
| 6,735,593 B1 | 5/2004 | Williams |
| 7,143,100 B2 | 11/2006 | Carlson et al. |
| 7,634,501 B2 | 12/2009 | Yabloko |
| 7,801,864 B2 | 9/2010 | Prahlad et al. |
| 8,260,824 B2 | 9/2012 | Mao et al. |
| 8,271,935 B2 | 9/2012 | Harris, III |
| 8,584,045 B2 | 11/2013 | Rode et al. |
| 8,725,767 B1 | 5/2014 | Wood et al. |
| 8,738,669 B1 | 5/2014 | Hsu et al. |
| 2003/0018832 A1* | 1/2003 | Amirisetty .............. G06F 9/465 719/328 |
| 2005/0022174 A1* | 1/2005 | Lauterbach ........... G06F 9/4492 717/148 |
| 2006/0195460 A1 | 8/2006 | Nori et al. |
| 2007/0192568 A1 | 8/2007 | Fish, III |
| 2009/0259683 A1 | 10/2009 | Murty |
| 2014/0025650 A1* | 1/2014 | Lee ........................ G06F 17/211 707/694 |
| 2014/0059196 A1* | 2/2014 | Onffroy .............. H04L 41/0233 709/223 |
| 2015/0095478 A1* | 4/2015 | Zuerner .................. H04L 67/12 709/223 |
| 2016/0147508 A1* | 5/2016 | Kramer ..................... G06F 8/36 717/108 |

OTHER PUBLICATIONS

Richard Paige et al. "The Single Model Principle," Journal of Object Technology, Nov.-Dec. 2002, pp. 63-81, vol. 1, No. 5, ETH Zurich.
Andrey Naumenko et al. "Two Approaches in System Modeling and Their Illustrations with MDA and RM-ODP", Proceedings of ICEIS 2003, The 5th International Conference on Enterprise Information Systems, Apr. 2003, pp. 398-402, Angers, France.
Codd, E.F. A Relational Model of Data for Large Shared Data Banks. IBM Research Laboratory, San Jose, California // Communications of the ACM, Jun. 1970, vol. 13, No. 6: 376-387. DOI:10.1145/362384.362685 // internet publication: http://www.seas.upenn.edu/~zives/03f/cis550/codd.pdf.
Codd, E.F. Relational completeness of data base sublanguages. IBM Research Laboratory, San Jose, California. RJ 987 (#170041), Mar. 6, 1972, Computer Sciences // internet publication: http://citeseerx.ist.psu.edu/viewdoc/download?doi=10.1.1.86.9277&rep=rep1&type=pdf.
Codd, E.F. The Relational Model for Database Management. Version 2. Addison Wesley Publishing Company, 1990. ISBN 0-201-14192-2 // internet publication: http://codeblab.com/wp-content/uploads/2009/12/rmdb-codd.pdf.

* cited by examiner

*Primary Examiner* — Alexander Khong

(57) ABSTRACT

The invention describes a data management system, where a declaration of causal dependency of values is realized by unified abstract connectors directly at the level of data meta-description and, for these purposes, supplements the generally accepted data model with a new fundamental member. The technical result of the invention is a significant increase in the speed of development and reliability of execution of application programs. The technical result is achieved through the use of advanced methods of internal organization and interaction of data model managing structures, as well as by methods of declarative programming.

8 Claims, No Drawings

SYSTEM AND METHOD FOR MANAGEMENT OF FUNCTIONALLY LINKED DATA

TECHNICAL FIELD

The present invention is related to a system and methods of identification, storage, extraction and transformation of information. More specifically, the present invention is related to the systems of database and general data management, and also to data structure, internal organization and methods of its interaction.

BACKGROUND OF THE INVENTION

A system for data management in general, and database management in particular, comprises a computer system that allows to users to uniquely identify, transform and store information in a structured, connected and logically integral form.

The modern methods of data management are based on set theory and, specifically on the relational data model, developed by E. F. Codd. Codd demonstrated that any data representation could be identified as a set of two-dimensional tables of a special kind, known in relational mathematics as a Relation. According to the relational method, a table represents each entity of a subject area, to facilitate understanding. Each column of such a table contains values for one of the entity attributes. Each line contains all characteristics (properties) of the entity instance.

Links between entities are represented by table attributes. In order to populate the tables with data, the links show which cells of a table are linked to the cells of another table. The link is realized through the equivalence of values in one or many columns of the linked tables. In this scenario a relational meta-model of data does not contain any rules or indicators, which allow us to connect any two values and, consequently, a database data load could only be performed by explicitly defining the values of attributes in the tuples of relationships.

As a consequence of the last consideration, modern data management systems based on the relational (or it's derivative, the object relational) model realize internal rules of subject area, which connect values derived from an entity attribute in a functional or an event-driven way, outside of the scope of the data management system, using miscellaneous technological approaches, computing tools and programming languages. Hence, the realization of a complete set of business rules for an application becomes a separate task, which requires constant control over logical integrity and consistency of data, which in its turn leads to various errors inclusive of trivial programming errors. Mutual isolation between data and the rules specific to their generation, and the resulting necessity to use traditional programming methods that in its turn leads to creation and testing of huge volumes of programming codes, significantly complicates development of programming applications.

The purpose of the present invention is to eliminate the aforementioned shortcomings as well as to realize a number of additional advantages.

SUMMARY OF THE INVENTION

The purpose of the present invention is the creation of progressive methods of internal organization and interaction of data management system structures, which would fully, or at least partially, eliminate the shortcomings specific to the relational data model, as well as provide a number of additional advantages which make it possible to create programming applications, in which all the algorithmic part is integrated directly into the structure of a database and thereby overcomes the limitations of the prior art.

The subject of the invention is a method for declaring causal dependency of information values derived from entity attributes, which consists in linking dependent attributes with an abstract Connector consisting of two instances of Sockets, each of which belongs to its own attribute.

In its first aspect the present invention complements the commonly accepted Data Model with a new fundamental member, the attribute Connector, and describes a system of data management that has declaration of causal dependency of the information values realized directly at the level of data meta-description by means of a unified abstract connectors.

A second aspect of the present invention describes a multiprocessor unit that, using a distribution of meta data subject declarations and their derivative data management system values in the local memory of a set of independent processors connected by hardware data transmission channels achieves a high level of parallel execution while realizing causal dependencies of information values.

An important feature of the present invention is a fully declarative nature of the metadata subjects used, that allows us to create application programs without writing program code, of any kind. This makes such programs fully platform independent. It is worth mentioning that the present invention has been utilized for a practical programming realization and has been used in the Visual Data platform designed for rapid application development. That and some other features and benefits of the present invention will be clarified in the following description and formula of the invention.

DETAILED DESCRIPTION OF THE INVENTION

From the prior art it is known that at the physical level of representation, any subject area of automation could be viewed as a finite set of specific information values, where values are being consistently modified by environmental events. In a data management system, each of these information values represents an instance derived from a specific characteristic of a Conceptual Entity. At the same time, a separate value cannot exist independently, being encapsulated in a tuple of values (represented as a uniquely identified Data Object in an object representation or a Table Relation in a relation representation), which represents an instance derived from a description of an abstraction-level Conceptual Entity.

Previously, E. F. Codd proved that at some level of abstract perception, any subject area could be uniquely described by a set of formalized entity declarations known as a Class (in an object representation) or a Table (in a relational representation), as well as characteristics contained within them (Attributes). The combination of Classes and Attributes provides a meta-description of a subject area, also known as an Application Model.

Inside an Application Model, each Class is identified, at minimum, by the name of a respective Conceptual Entity and a tuple of attributes. The tuple of Class attributes uniquely defines an internal structure for the storage of information values, which is identical for all instances of a given Class. This defines an immutable order of attributes in a tuple. Each Class attribute is described by, at minimum, the name of a Subject Characteristic as well as a functional type and storage mode of its derivative value. Separate Conceptual Entities in a subject area are interconnected in a quantitative relationship and this connection defines the amount of quantitative interaction between derivative instances of these Entities. In each such interconnected Class, a Relationship Attribute represents this link.

The Class and Attribute declarations that describe separate Conceptual Entities and their private characteristics, in their turn, are instances, derivatives from formalized abstract entities, -meta-Class and meta-Attribute, the latter being concepts of a higher level of abstraction, which form a Meta-model of the data management system and are fundamental members of this system.

Thus, there are three levels that could be identified in a data management system:
 1. A level of the Meta-model of the system itself
 2. A level of the Application model
 3. A level of the final information values It is important to note that all the subjects of the first two levels mentioned above represent a declarative description, which exists in a machine-readable form, and are ready for long-term storage. A system of data management utilizes declarative subjects as a base for the creation of derivative instances of a subsequent level, and executes this operation in a standardized manner. It is worthwhile pointing out that the Subjects of an Application Model level are commonly known as Metadata Subjects.

For the purposes of the present inventions it is important to note the existence of a causal dependency, which interconnects separate values of a subject area. As an example, we take an Invoice line where Total value is equal to the multiplied values of two arguments: Quantity and Price. A change in the value of any of these arguments immediately leads to a change in the value of the Total. Thus all the three values are permanently correlated. In other words, on a physical level, this dependency acts in such a way that all changes of connected values are executed simultaneously and consistently with no identifiable intermediate state.

In order to solve the task of making interconnected values mutually consistent, the present invention introduces an abstract notion of a Universal Connector. At the level of the Application Model, a Universal Connector links Class Attributes in pairs, hence providing the means for them to exchange values.

A declaration of dependency created in this way is being perceived by a computing system as a single rule of a subject area, according to which a dependent Attribute creates its instance of a value. A single rule like this could effectively be infinitely combined, having only one restriction that forbids creation of cyclic dependencies. At the same time, a system of data management, regardless of total extension and number of branches of a formed system of dependencies, is capable of providing synchronicity and consistency of results due to the encapsulation of all intermediate states.

A direct usage of the Connector in the form of a declaration of some Application Model entity is not always practical from the point of view of a practical realization of its interaction with linked attributes. Therefore, in an Application Model, a Connector is being used only in its abstract form, which simplifies visual perception of connections between attributes. For declarative representation of a Connector in a Data Model we use the concept of a Socket (aka end Connector or Outlet).

A pair of end Sockets is an integral part of any Connector, which utilizes them to interact with linked entities. Note that in an Object Application Model, when a quantitative interaction of Subject Entities is realized, a role similar to the aforementioned Connectors is performed by Relation Attributes that contain a full description of relationship properties in their characteristics. Similarly, each of two Sockets of a Connector contains a full description of characteristics for a link declared from its side, and this information is entirely sufficient to organize an unrestricted interaction of Attributes.

Consequently, at the level of an Application Model, when causal dependency of two Attributes is declared, each of them is assigned a Socket, which, in its turn, is an instance derivative from an abstract Meta-Socket entity.

It is important to stress that the present invention complements the standard and generally accepted Meta-Model of a Data Management system with a third, fundamental member: a formalized abstract Meta-Socket. A Meta-Socket is linked to a Meta-Attribute by a child-parent relationship, in exactly the same manner as a Meta-Attribute is linked to a Meta-Class.

A Meta-Socket represents the same formalized description as a Meta-Class or a Meta-Attribute, and hence includes a declarative description of Socket instance characteristics, more details on which is to follow.

A singular Socket is described by at least three aspects: address, function and event, whereby each of them includes a respective set of declarative characteristics.

An address aspect allows a Socket to uniquely identify an opposing Socket of their common Connector in an Application Model. Note that a Socket does not posses a direct (global) identification of its own, because it is localized in a tuple of an Attribute, which, in its turn, is used in a tuple of a class. In such an Application model with a complex multilevel structure, in order to realize links between Sockets, we should use the most simple, compact and universal system to organize internal identification of all Subjects of a Model. At the same time, to make the picture complete, we ought to remember that in an object representation, an Attribute could define not only unitary but also enumerable form of storage for its derivative information values.

The enumerable form assumes that characteristics of an Attribute contain, apart from a proper name, a tuple of user names for enumerable elements, whose derivative value is represented by array of values. As a result, a full address aspect of a Socket should include identifiers of a Class and a Class Attribute containing opposite Sockets as well as the identifier of an opposite Socket in a tuple of an Attribute and the identifier of an element of the enumerable form of an Attribute.

Note that a Class with an Attributes tuple and an Attribute with a Socket tuple represents a child-parent relationship in an Application Model.

Similarly, Application Model Classes also create a tuple, which belongs to a service abstract entity named a Super-Class. Also note that the aforementioned tuple of a Super-Class could be formed not only directly by Classes (instances of a Meta-Class) but also by Attributes of the relation with a Super-Class, where such a relation automatically declares each class while it's being created.

Logically, each aforementioned tuple contains a linear set of unified instances (within the tuple) and in the most general case represents a dynamically expandable array of cells. In order to add a new member to such an array a new cell is created, which allows for unique identification of each tuple member by an index of the tuple element.

This specific feature allows us to describe the full address aspect of a Socket by a simple formatted entry, which includes four indexes of the aforementioned subjects.

The aforementioned unified index identification method of all miscellaneous instances of an Application Model derived from Meta-Classes, Meta-Attributes and Meta-Sockets of a data management system is an important aspect of the present invention. These methods not only allow us to simplify and standardize declarative indexation, but also significantly increase the speed of realization for methods of access to a requested instance—a subject of the Application Model. Additionally, the index method of identification guarantees the full independence of an Application Model from Class and Attribute names specified by users, which are mostly borrowed from notional entities and their characteristics.

While analyzing the address aspect of a Socket, the following important feature related to the use of an index of an enumerable element contained within the Socket should be noted. If a value is being transmitted through an abstract Connector, the aforementioned index cannot be initialized in two scenarios:

1. A target Attribute does not use an enumerable form of storage
2. A Socket utilizes all elements of an enumerable form at the same time In the last case, an abstract Connector is used simultaneously and consistently in relation to all elements of a target Attribute, hence realizing a group dependency. However, if an abstract Connector links two Attributes with an enumerable storage form and the aforementioned index of an address aspect is not initialized for both Sockets, the group dependency is realized only in pairs, i.e. only the elements of an Attribute with an equal index could interact via the common Connector.

The functional aspect of a Socket allows us to manage value changes and contains, including but not limited to, the identifier of a calculation method and an inversion flag.

In the computing environment of a data management system, each functional value type is related to a predetermined set of computing methods (functional methods or Functionals), which are potentially applicable to the value of that type. Each method could be uniquely identified, inclusive of the identification by a numeric index-identification. In the earlier example (Total=Quantity×Price), where the Total attribute is linked to the Quantity attribute by one connector and to the Price attribute by another, such a method is represented by the arithmetic operation of multiplication.

It is worth pointing out that an abstract Connector could link two Attributes only if their functional types are congruent or if a system of data management contains at least one predetermined method, which allows us to convert a value from a functional type of one Attribute into a functional type of another.

The flag of a value inversion (Inverse) is used in elemental arithmetic and logical operations to change the sign of an argument value as well as to change the type of an operation. Hence it facilitates the reduction of the nomenclature of predefined methods in a data management system. For instance, if an inversion flag is set on a Socket localized to the tuple of an argument-attribute, it will change the sign of an argument value to the opposite; at the same time, a Connector does not change the transmitted argument value but only transmits with it the value of an inversion. However, if an inversion flag is set on a Socket localized to the tuple of target-attribute, the flag modifies an operation type. As an example, it could replace multiplication with division by argument value.

The event aspect of a Socket allows for the management of a value transmission and is characterized by Set and Get flags, which allow for an Attribute to use a Socket in the operations of value extraction and distribution. In the computing environment of a data management system, the use of an abstract Connector formed by a pair of Sockets is based on two fundamental methods exposed by a Meta-Socket. At the level of acting Attributes it is being realized as follows:

1. A Set method is provided by a Socket in order to transmit a value to the opposite Socket of a target Connector attribute. With any change of its derivative value (regardless of the cause and source of the change), an Attribute sequentially examines its tuple of sockets and, for each Socket marked with a Set flag, calls the method of a Set Socket, with no consideration for consequences.

2. A Get method is provided by a Socket in order to query the value of the opposite Socket. Regardless of the source of the event that triggers the creation of a derivative value, an Attribute sequentially examines its tuple of sockets and, for each Socket marked with a Get flag, calls the method of the same name. A Get method returns a value to an Attribute; in order to get the final value, an Attribute applies to this value a computing method assigned to the Attribute, while also considering the functional aspect of the Socket In order to explain an important aspect of the present invention, it is important to note the fact that in all modern data management systems, inclusive of those based on the relational representation, an Attribute manipulates a value that exists in an explicit storage form. Thus, the methods of an Attribute are utilized only to extract the stored value or to save the value created outside after transforming it into a storage-adjusted form.

With the introduction of abstract connectors into an Application Model, an Attribute acquires a method to calculate a derivative value 'on-the-fly', inside a Data Model, at the time when the Attribute is referenced. This leads to the following important consequences:

1. If a stored derivative Attribute value has not been initialized (has not been created) by the time the attribute is referenced, then, provided that the Attribute has Get sockets in its tuple, this Attribute is capable of creating and storing this value directly at the time of its reference. Alternatively, if a value is stored, the Attribute will return this value without referencing the socket tuple.

2. As a result, now it is possible to introduce into the meta-model of a data management system a new event-driven Recalculate method for an Attribute. This method allows us to "bind" the creation of a derivative value to an external event. The Recalculate method, applicable when an Attribute tuple contains Get sockets, compels the Attribute to re-create the stored value by querying a socket tuple.

3. Now it is possible to declare an Attribute as dynamic To achieve this, the attribute characteristics are complemented with a Dynamic property flag. A Dynamic Attribute (with an assigned Dynamic flag), being a full attribute in a Class tuple, fundamentally does not create a derivative value in a storage form and, respectively, when referenced, it does not attempt to extract a value from the storage system. Instead, when referenced, a Dynamic Attribute creates the return derivative value by querying its Get Sockets.

Naturally, a direct consequence of such behavior is the fact that a Dynamic Attribute is unable to accept a value from outside. In the previous example (Total=Quantity× Price), the Total Attribute could be declared as Dynamic, if necessary. To differentiate non-dynamic Attributes, hereafter they will be referenced as Static. The introduction of a Recalculate event and Dynamic properties of an Attribute into a data model is an important aspect of the present invention, which significantly improves general functionality of the data management system. It also allows us to implicitly manage the overall physical productivity of a system by combining static and dynamic methods used by Attributes to create their derivative values.

A causal character of a declared attribute dependency assumes that an abstract

Connector has such characteristics as the direction of data transmission and the activity of a dependency action. Both characteristics are naturally defined by the state of Set and Get flags in both Sockets of a Connector.

A Get flag determines the direction of a value transfer indirectly. If a Socket is assigned a Get flag, an Attribute can (by querying) receive a value from this Connector. A Get flag is set at the time of creation of the Connector in a Socket of the target Attribute corresponding to the direction of the value transfer. A Set flag determines both Connector activity and the direction of the transfer. If a Socket is assigned a Set flag, the Connector actively transmits any change to the value of an Attribute that owns Set Socket to the address of the opposite Attribute. If a Set flag is not assigned to any Socket, the Connector does not have any activity of its own and transmits values only when referenced. Lets point out that a Socket tuple of a Dynamic Attribute, by definition, cannot contain any sockets with a Set flag.

There is an individual case, when a Set flag could be assigned to both Sockets of a Connector. In the previous example (Total=Quantity×Price), if the Total attribute is static and both connectors (Price→Total and Quantity→Total) are active (Set flag is assigned to the Sockets of Quantity and Price attribute-arguments), the Total attribute clearly cannot receive a random value from outside, because that would violate the general rule of mutual dependency between the values of three Attributes, which is declared by Connectors and enforced by the computing environment. In this case an external value can only be accepted by the Total if the resulting change of a value could be reversed into one of the two attribute-arguments (for example, into Price), i.e. a value of the argument could be forced to change in such a manner that it corresponds to the introduced value of a result.

To declare a possible reversal of a value of the Total, it is sufficient to assign a Set flag in its Connector socket to the required argument.

After receiving a value from outside, the target Attribute determines the reverse Socket (the one with both Set and Get flags assigned at the same time), using declarations of a functional method and other Get sockets, "calculates" the value of an argument that satisfies their rules, and transmits this value to the reverse Socket.

It is worth pointing out an important general feature of the realization of the computing environment of a data management system: when an Attribute receives or extracts a Socket value, the socket in question is excluded from all the consecutive queries (Get) and transmissions (Set) in order to optimize the execution process and to block any undesirable reverse connections.

For the purposes of the present invention, it is important to note a specific feature of attributes interaction via an abstract Connector, —the isolation of an execution. In a most general case, an Attribute executes the following cycle:

1. An Attribute receives an incoming message containing a pointer to the target data object at the address of one of its Get Sockets 2. The Attribute creates a new derivative value, possibly by an additional querying of its Get Sockets 3. The Attribute initializes its Set Sockets to send an outgoing message.

This means that the Attribute, acting as a "factory" producing derivative values, or exposing values to a query, is logically isolated and does not contain any information about the immediate environment; the Attribute interacts with this environment through sending and receiving information messages via Sockets. Thus, the function of an intermediate link in the process of message exchange is delegated to the computing environment of a data management system; this environment realizes all execution cycles consequently to their successful completion regardless of the length of Attribute dependencies.

Respectively, the total reaction time of such a "sequential" data management system to an external event directly depends on the total number of Attributes and Connectors involved in the process, and could be quite significant.

At the same time, it is easy to imagine a computing environment, where some initial Attribute along with all its declarations, inclusive of Socket declarations and derivative values, occupies a local memory in a single processor connected to other similar processors by direct programming and device channels of data transmission; the local memory of these processors contains Attributes, which are connected to the initial Attribute by abstract connectors. The total time of a system reaction to an outside event in such a conditionally parallel multiprocessor computing system will be approximately equal to the same time in a sequential computing environment only in a rare case, when the system of dependencies is represented by a strictly sequential chain. In all other cases, the total reaction time of a "multi-branch" dependency system will be significantly shorter due to the parallel execution in separate "branches".

In a multiprocessor computing environment, the length of the longest sequence of dependencies, regardless of any branches attached to such a sequence, determines the time of a system reaction to a single user event. Additionally, unlike a purely sequential system, a multiprocessor system can start the parallel processing of an arbitrary number of external events, referencing various attributes, simultaneously, which significantly reduces the total time of reaction in a data management system. Usually, in order to organize a program execution in multiflow computing environments, some additional effort to enforce parallel execution of business processes inside a program is required.

An Application Model, created by multiple Attributes connected by abstract Connectors, where the functionality of each Attributes in isolated, and declarations are localized in a separate memory of a respective process, by default becomes "parallel" from the point of view of the execution of a process in the multiprocessor environment. Naturally, that takes place, when Attribute declarations and derivative values are located in the memory of processors in a way ensuring that the connection between Attributes is realized through the communication channels of processes.

For the purposes of the present invention it is important to stress that various aspects of an abstract connector of two Attributes could be assigned with a causal dependency from a third Attribute. The derivative value of this third Attribute dynamically modifies the functional behavior of the dependent connector. Such a dependency in an Application Model is also declared and realized by an abstract Connector, which links one of the Sockets of a dependent Connector with a managing Attribute. This managing Connector in effect represents an addition to the main dependent Connector, which, in this case, is viewed as the base Connector. For convenience, hereinafter, the dependent Connector, its Sockets and connected Attributes will be referred to as the "base", while the managing Connector, its socket and the managing Attribute will be additionally identified with the "condition" prefix.

An interaction between a base and a condition-Socket, which are harmonically localized in a common tuple of a base Attribute, could be realized in a variety of ways, inclusive of the use of a system of mutual pointers to one another. However, the most preferred option is when the Socket of a managing Connector is fully encapsulated into the body of the base Socket. Such an implementation has the following advantages:

1. An opposite Socket localized in the tuple of a condition-Attribute is capable of referencing the base Socket directly rather than its opposite Socket, and it broadcasts its events to this Socket 2. The properties of a managing Connector are fully defined by the properties of a Socket in the condition-Attribute tuple, while the encapsulated opposite Socket retains only its address part 3. The type of encapsulation is fixed by a designation.

A base Socket allows for only three permanently positional fixed encapsulations of managing Sockets, where each encapsulation corresponds to a single defined aspect of base Connector functionality, namely: blocking, address and context, which will be described in more details. For the purposes of the present invention, it is important to emphasize that the aforementioned encapsulations and the aspects managed by these encapsulations could be enacted simultaneously with any mutually relevant combination.

An encapsulation is considered relevant if it contains the address part of the opposite Socket of a managing Connector. When a Set or Get method applied to it is executed, the base Socket checks all three encapsulation and, for each relevant encapsulation, executes an action corresponding to its functional aspect.

It should be noted that the introduction of the causal dependency of a Connector in an Application Model complements the execution environment of a data management model represented by Set and Get methods with two new methods: Unset and Reset.

Correspondingly, the unified structure of a Socket (Meta-Socket) is complemented by two eponymous flags, which allow us to call a respective method. In practice, the Unset and Reset flags are used only with respect to managing Sockets, while the methods, enabled by them, are in fact events, which notify a base Connector about changes to the value of a managing Attribute: Reset signals initialization of the managing value; Unset signals its de-initialization. Thus the managing value is not transmitted; if necessary, a base Socket extracts it autonomously. The mechanism of use for Unset and Reset methods is quite simple: in the process of changing its derivative value, prior to the actual change, a static Attribute consequently examines its Socket tuple and, for each Socket with a Unset flag, calls an eponymous method (Unset). After the new value is set, an Attribute once again consequently examines its Socket tuple and, for each Socket with a Reset flag calls an eponymous method (Reset) again. As a result, the referenced base Connector is firstly initialized (Unset) to execute an action opposite to its direct impact on the dependent value (similarly to the de-initialization of its value at an initial managing context value), after which it is initialized again (Reset), but this time for a direct action with the new managing value. A base Attribute, possessive of an encapsulation. In its turn, extracts the managing value using the Get method and the address component of this encapsulation.

Lets review the management aspect, which is easiest to understand—the blocking of the broadcast function of a Connector. A managing Connector with a blocking aspect is created when an Attribute of a logical type is selected as a managing condition-Attribute. If declarations of a base Socket contain a relevant blocking encapsulation, all the methods of this Socket, before being executed, query the state of the managing Attribute (a concrete derivative value). If a Get referencing the condition-Attribute returns the value of True, the execution of the current method of the base Socket will continue; otherwise (False), it will be cancelled.

Note that an autonomous Socket of a managing Attribute, localized in a condition-Attribute tuple, in its turn, could be perceived as a target subject of the blocking management. This allows us to create blocking managing chains of any length.

The fact that the properties of an abstract Connector contain an address aspect allows us to link attributes of different classes with abstract connectors.

Our presentation until this point has implicitly assumed that attributes linked with abstract connectors belong to the same class, and, respectively, their derived values interact within one derivative instance of a Class (data object). However, if an abstract connector links Attributes of different Classes, to access a target value, which belongs to another data object, the parameter section of a socket method should (along with the target metadata subject identifiers: Class, Attribute (element), Socket) include the identifier of a target object. The identifier of an outside data object could only be contained in the initial object as a value, derivative from the relationship attribute. Hence, a link between attributes of different classes is possible only if these attributes are localized in the Classes that have a quantitative interaction relationship (Class relationship); and such a link would take the type of this relationship into consideration.

At the same time, the realization of the aforementioned connection in the form of an abstract connector should use relationship attributes as the managing Attributes of this Connector. Thus, when the Connector of an abstract attribute is created through the relationship of classes of these attributes, a managing Connector with a respective relationship attribute is automatically connected for one or both of the base Sockets; and this Connector is included into the address aspect of a base Socket.

If declarations of a base Socket contain a relevant address inclusion (encapsulation), all Set or Get methods of this Socket query the value of a managing Attribute before being executed. If the Get call referencing a managing Attribute returns null (i.e. the relationship declared in classes is not realized on the object level), the execution of the current method of the base Socket will be cancelled. Otherwise, the value received will be included into a parameter section of the method, which is referencing the opposite Socket, as an identifier of the target data object.

Note that with the direct dependency expressed by an abstract Connector we can also link relationship attributes localized in different classes.

As an example of such dependence, let's review the following subject area (in the form of a statement): "An Employee belongs to a Department of a certain Company". If all three Classes (Employee, Department, Company) are linked with an explicit relationship "many-to-one" (Department→Company, Employee→Department, Employee→Company), a similarly explicit dependency could be declared; this dependency links attributes of the Department Company and Employee Company relationship and is realized through the Employee→Department relationship. The conceptual clarity is contained in the fact that one of the characteristics of an Employee reveals him as being a part of a particular Company, the Company being the same (and only the same) to which his Department belongs to. If for some reason the whole Department is transferred to another company, the direct Connector will automatically assign to each Employee a new value of the Company pointer. In other words, when the specified declaration is in place, a data model is capable of automatically retaining the referential integrity and consistency, which is maintained directly at the level of the stored data. Thus, a side effect of the aforementioned referential dependency is an automatic restriction effected by the data model when an Employee selects a different Department in the same Company (for example, when an Employee changes his role). Out of the full set of all Department of all Companies the data model will only allow us to choose the Departments of the Company to which the Employee belongs.

Apart from the examined referential dependency, there are at least a few other types of dependency created in a class system with different combinations of relationships between classes; these other types require an adhesion to the rules of consistency and mutual concord between the values of relationship attributes. The study of all these dependencies is out of the scope of the present description, however for the purposes of the invention it should be emphasized that all of them could also be realized with the use of Abstract Connectors.

An interaction of values through an asymmetric "many-to-one" class relationship holds as one of the assumptions that the set of values on the "many" side creates a unique set of values on the "one" side. Such a union is possible only when using some of the aforementioned methods, predefined at a data meta-model level and named "attribute functional". For example, in an Invoice Class the total amount of an invoice (Total) equals to the sum of all totals at individual lines of this invoice; this sum is realized by a Connector, which links Total attributes in the Invoice and Invoice Record classes, and a respective Total Attribute Functional in the Invoice Class, which sums up the incoming set of values.

With the context aspect of management present in the properties of an abstract Connector, an Application Model is capable of creating complex attribute values, formed as a record list in a "key-value" format. Such a list is ordered by the key value, which allows us to extract separate unitary values from the list by the key value. In order to manage the list, a meta-model predefines a corresponding functional, which uses a context managed abstract connector as a source of the values and the keys.

As an illustration, lets review a list attribute "Rate List" in a class "Currency", which contains a record list formed by pairs of values: Rate for a certain Date, derivate from attributes localized in a class "Date". Obviously, to create such a list by the Rate List attribute on the "one' side (Currency) of a relationship, each value of the Rate of the set on the "many" side should receive a respective value of the Date. Such an assignment is effected by a managing connector using a context aspect of the management.

When declarations of a base Socket contain a relevant context inclusion (encapsulation), all Set and Get methods of this Socket will, prior to their execution, query the value of a managing Attribute. If a Get call, referencing the Attribute-context, returns null (the value has not been initialized), the execution of the current method of a base Socket will be cancelled. Otherwise, the value received will be included into the parameter section of a method that faces the opposite Socket, as a context value complementing the main value. Subsequently, the functional, managing a list, uses the context value as a key to localize the required record.

It is to be noted that a context value could be used not only to form a key-value list, but also for the extraction of a value from such a list; the extraction being effected by a similar connector to a managing context.

For the purposes of the present invention it is important to emphasize that an abstract Connector is used not only to describe and realize causal dependencies of a subject area, but also to address purely internal utilitarian tasks of a data management system. Such tasks include the management of referential symmetry and the maintenance of referential integrity.

In the object data representation paradigm, referential integrity is strictly enforced by full symmetry of the class relationship, which is expressed by the fact that each (direct) reference value in an initial object that points to another (opposite) object has a respective (opposite) reference value in the opposite object that points to the initial object. Respectively, in the declaration of a quantitative interaction (relationship) of two classes, a relationship Attribute, specified by an identifier of the class opposite in the relationship, is created in each of these classes. Thus a referential value, derived from a relationship attribute, is in fact an identifier of the target object.

It is logical to assume that both relationship attributes should be linked by an active abstract connector, hereinafter named referential, which guaranties referential integrity and relationship symmetry on an Application model level. However, the direct realization of such a connection is forbidden by the fact that attributes of a common relationship have different value types in different classes. To explain the mechanism of the realization of a referential Connector, we should recall that a Class contains in its tuple, among others, a service Self Attribute, whose existence is declared directly in a meta-Class. In a concrete Class, representing an instance of a meta-Class, the Self Attribute is characterized by an identifier of its Class, and, correspondingly, the identifier of this object will become the derivative value of this Attribute in a data object.

For each of the classes linked in a relationship, the value type of a Self attribute coincides with the value type of a relationship Attribute in the opposite Class, which allows us to link these attributes by an abstract (referential) Connector, using a relationship Attribute on the Self Attribute side as an attribute managing the address aspect. When a Class relationship is declared, such a referential Connector is created automatically, immediately after the creation of relationship attributes; thus a base Socket, localized in the Self Attribute tuple, also automatically receives an additional address aspect managing Connector to the aforementioned relationship Attribute in its class.

In a fully symmetrical relationship of a quantitative "one-to-one" type, both relationship attributes are fully equal; hence a referential connector is created for each Self Attribute in each class. Thus, when an Attribute receives a referential value in any of the class objects that are linked by "one-to-one" relationship, it immediately leads to the same value being received by its opposite relationship attribute.

A "many-to-one" type relationship clearly display asymmetry of realization, exemplified first of all by the fact that only the relationship attribute on the "many" side is allowed to initiated an exchange of identifiers, because the value of a relationship attribute on the "one" side will be represented by a derivative conditionally passive list of "reverse" references. Accordingly, when the relationship of such type is created, a referential connector is created only for the Self Attribute on the "many" side.

Thus, since the aforementioned list of reverse references exists in accordance with general rules of the list, and is a record list in a "key-value" format, managed by a unified functional, the referential connector is automatically supplemented by yet another managing connector, but this time with a context management aspect. The attribute representing the main class characteristic (Name or Event (Date)) is selected as a context management Attribute by default.

The "many-to-one" asymmetry mentioned above creates a need for new terminology: a reference attribute on the "many" side will be referred to as the "direct" reference attribute, while a relation attribute on the "one" side will be referred to as the "reverse" reference attribute. In a symmetrical "one-to-one" relationship both relationship attributes are equal and are in fact "direct" reference attributes.

In both relational and object realizations of a data management system, an entity characteristic is defined for the management of the data object life cycle; the value of this characteristic indicates whether a data object is active or flagged as deleted. Accordingly, any class contains in its tuple, among others, a service Delete Attribute, whose existence is declared directly in a meta-class.

If a data object has an initialized value of the Delete Attribute, the data object is considered Deleted (not relevant). According to the rules of referential integrity, a deleted object must de-initialize all its links with the other objects in such a way that a data management system does not contain any direct or reverse references to this object. Thus, if any relevant "reverse" references to the data object exist, the deletion of the object is considered incorrect from the point of view of a subject area and an application model because this leads to a loss of very important information. For example, if an Invoice object is deleted, the Invoice Record objects become factually isolated. In other words, if at least one Invoice Record object exists, the deletion of the Invoice object should be forbidden. At the same time, provided a condition, which stipulates that all Invoice Records objects should be deleted alongside with the Invoice object, is satisfied, the deletion of the Invoice object does not violate the referential integrity.

Let's review the mechanisms of realization of the aforementioned causal dependencies with abstract connectors of an application model in more details. It is obvious that a Delete attribute has abstract connectors with each relationship attribute in its class and these connectors are created automatically when class relationship is initiated.

The referential Connector described above, on the side of a Self Attribute (direct reference), is complemented by a managing Connector to a Delete Attribute, which has a blocking aspect (hence all three aspects of the base Socket of a referential Connector localized in a Self attribute tuple are relevant).

This managing Connector has a permanently assigned Inverse flag and, when the value of a Delete attribute is initialized, blocks the broadcast function of the base Connector, which in its turn leads to the de-initialization of the link between objects, with a respective value in a reverse reference of the data object of the opposite class being reset to null (the value of a direct reference in the initial object is retained). In a "one-to-one" type relationship, where relationship attributes are symmetrically linked with referential connectors, and a direct reference Attribute also represents the Attribute of a reverse reference, the initialization of a Delete value leads to the both referential values being reset to null. Thus, in any class relationship type, a deleted object automatically resets to null all its external references in other data objects.

Aside from this, a Delete Attribute has passive abstract Connectors to each attribute of a reverse reference in its class. The presence of such connectors allows an attribute functional to inspect the state of reverse reference values, and, if at least one relevant value is present, to permanently block the procedure of data object deletion.

The rules of a subject area could require the deletion of an object inclusive of all other objects referencing this object. For example, to delete an object Invoice with all the Invoice Record. In such a case, an abstract Connector, linking Delete Attributes in Invoice and Invoice Record classes, with a Set flag assigned on the side of an Invoice, should be created. Such a Connector in an Invoice Class will be automatically complemented by a managing Connector to an Attribute of a reverse reference (Invoice Record), and, at the same time, the aforementioned Connector, linking Delete and Invoice Record, will be deactivated (Get flag reset). Next, when the value of a Delete Attribute in an object of the Invoice class is initialized, the current list of Invoice Record reverse references is used to initialize Delete in all Invoice Record objects referencing the initial Invoice object.

Thus, as it was demonstrated, a declaration of a functional causal dependency of values, utilizing unified instances of Sockets, which form abstract Connectors for Attributes of various types and purposes, represents a universal method for the realization of the most complex functional behavior, realized by a combination of very simple methods and declarations. Importantly, it applies not only to the functionality defined by the needs of a subject area of automatisation, but also to the service, strictly internal functionality of a data management system itself.

Since all Sockets represent simple declarative instances of a meta-Socket and all execution methods are predefined system methods, a target functionality of any level of complexity could be realized without any programming code, merely by the creation of abstract Connectors and assignment of their flags directly at an application model level, while all these actions could be fully realized by direct visual development.

It is important to emphasize that this description reviewed the most important aspects of abstract Connectors and Sockets and their most significant behavior. At the same time, various modifications of the above description could be effected without stepping away from the spirit and scope of the present invention, which is limited only by the formula of the invention and its equivalents.

The invention claimed is:

1. A system of data management in a computing environment, including at least one computer processor and memory for data storage linked to the processor, in which data are represented by machine-readable information values, which are instances, derivatives from formalized machine-readable meta-descriptions of conceptual entities and characteristics of these entities, named entity attributes;
   wherein a declaration of the causal dependency of the aforementioned information values is a meta-description in the form of an abstract unified connector of the aforementioned attributes,
   and each of the attributes linked by the aforementioned abstract connector has a data structure, named a socket,
   and each socket stores a full set of address, functional and event characteristics of the aforementioned abstract connector relative to the entity attribute to which it belongs.

2. The system of data management according to claim 1, wherein an identifying feature being the fact that the full set of aforementioned sockets of a single entity attribute creates an attribute socket tuple in the form of a homogeneous array, where each socket is uniquely identified by its fixed sequential number.

3. The system of data management according to claim 1, wherein the aforementioned address characteristics of an abstract connector are represented, including but not limited to, by identifiers of a target entity attribute and socket attribute on the opposite side of the connector; the aforementioned event characteristics of an abstract connector specify, including but not limited to, the direction and conditions for a value transfer through a connector; the aforementioned functional characteristics of an abstract connector specify, including but not limited to, how a value is modified during transmission.

4. The system of data management according to claim 1, wherein a causal dependency of the aforementioned address, functional and event characteristics of the single socket of an abstract connector of two entity attributes from an information value, derived from a third entity attribute, is also realized by the creation of two sockets forming an additional abstract connector according to claim 1 and in this case the second socket of the additional connector belongs to the attribute, which owns the dependent socket and both these sockets are linked by mutual pointers.

5. The system of data management according to claim 4, wherein the dependent socket encapsulates the socket of an additional connector.

6. The system of data management according to claim 1, wherein the aforementioned conceptual entity attribute has an additional characteristic, which contains the identifier of a system functional calculation method, and each individual calculation method of the full set of calculation methods of the mentioned system could be uniquely identified.

7. The system of data management according to claim 1, wherein the aforementioned conceptual entity attribute has an additional characteristic that allows the attribute not to store derivative value, but to form a derivative value, by using the existing instances of an abstract connector.

8. A computer or microprocessor, implemented computing environment that includes a processor or processors and a memory connected thereto, which contains a sequence of processor commands, wherein execution of said sequence of processor commands implements the system according to claim 1.

* * * * *